Oct. 12, 1926.
E. W. BITTICKS
AIR LINE LUBRICATOR
Filed Feb. 16, 1925
1,603,187
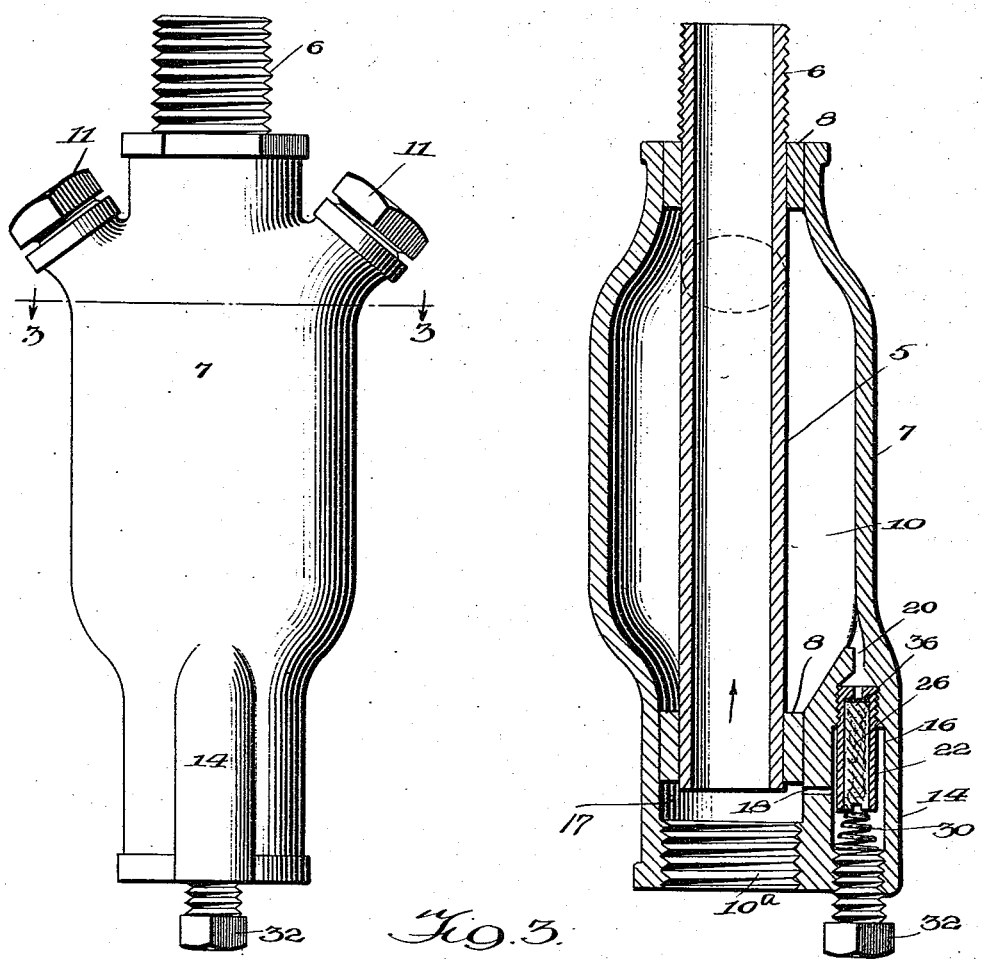
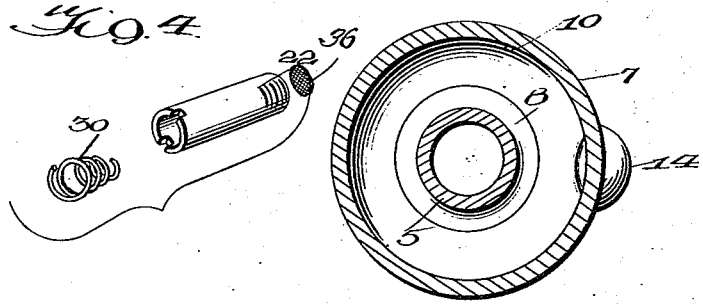
INVENTOR
E. W. Bitticks,
BY
Stevens and Batchelor
ATTORNEYS Patented Oct. 12, 1926.

1,603,187

UNITED STATES PATENT OFFICE.

EMRA W. BITTICKS, OF NACOZARI, MEXICO.

AIR-LINE LUBRICATOR.

Application filed February 16, 1925. Serial No. 9,703.

This invention relates to lubricators especially adapted for use in compressed air lines.

Briefly stated an important object of this invention is to provide a lubricator for compressed air lines having novel means whereby the supply of lubricant is automatically governed by the velocity and volume of the flow whereby the operator is relieved of the necessity of periodically lubricating the system.

A further object of the invention is to provide a lubricator which may be installed in a compressed air line without substantially altering the mechanism associated with the line and without the exercise of unusual skill.

Other objects and advantages will be apparent during the course of the following description.

In the accompanying drawing forming a part of this application and in which like numerals are employed to designate like parts throughout the same, Figure 1 is a side elevation of the improved lubricator.

Figure 2 is a vertical sectional view through the same.

Figure 3 is a horizontal sectional view taken on line 3—3 of Figure 1.

Figure 4 is a group perspective of a filter member embodied in the invention.

In the drawing wherein for the purpose of illustration is shown a preferred embodiment of the invention, the numeral 5 designates a conductor for compressed air and one end of the conductor is externally threaded as indicated at 6 for direct or indirect connection with a compressed air machine. That is to say, the conductor 5 is adapted for communication with a compressed air operated machine.

Figure 2 illustrates that a shell 7 somewhat in the shape of a bulb is internally and externally reduced at its ends and has air tight connection with the adjacent portions of the conductor 5 by means of sealing members 8 in the form of sleeves. Figure 2 further illustrates that the inlet end of the conductor 5 is arranged within the shell at a point spaced from one end of the same and that the shell is internally threaded as indicated at 10ª for connection with an air line.

It will be seen that the conductor 5 and the sealing members 8 define an annular chamber 10 in which a quantity of lubricant is contained. Of course the lubricant is in a fluid state and the supply of lubricant may be replenished from time to time by a pair of filler plugs 11. These filler plugs may be removed to permit of the convenient filling of the lubricant receiving chamber.

The shell is provided adjacent the air inlet part of the device with a longitudinally extending boss 14 having a lubricant conducting chamber or passage 16, the said passage 16 being provided with a lateral branch 18 by means of which communication is established between the compressed air line and the chamber 16. It is also to be noted from Fig. 2 that the inset or inlet end of the air conductor 5 with its sealing member 8 defines an annular abutment producing a chamber or pocket 17 from which the branch or duct 18 leads to establish communication with the passage 16. It will be appreciated that this abutment will slightly obstruct the air passing to conductor 5 and divert a portion into the adjacent duct 18, thus making the lubricator highly responsive to changing air line pressures.

The lubricant conducting chamber 16 is provided at what might be said to be its forward end with a reduced passage 20 by means of which the oil may flow from the oil reservoir 10 into the chamber 16. Figure 2 illustrates that a cylinder 22 is threaded into the forward portion of the boss 14 and is provided with a longitudinally extending bore in which an oil filtering more or less absorbent body 26 is confined and it is necessary for the oil in passing from the reservoir 10 to pass through this filter before it can enter the compressed air line.

The filter 26 is backed up by a coil spring 30 which is in turn backed by a set screw 32, the latter being threaded into the rear end of the boss. In carrying out the invention a piece of screen cloth 36 is confined between the forward end of the filtering body 26 and the apertured forward end of the filter carrier so that the filter cannot be forced through the apertured forward end of the filter carrier and possibly close the same.

In use the device is incorporated in a compressed air line of a compressed air operated machine either before or after the reservoir is supplied with a lubricant. Now as the compressed air travels through the line a portion of the air will pass through the orifice 18 into the chamber 16 and through the filter 26. The compressed air travels through the filter and the passage 20 into the oil reservoir 10. The air under pressure continues to flow into the oil reservoir until the pressure of the air in the air line and the oil reservoir balance. At this cycle of operation the air in the reservoir will force some of the oil out through the passage 20, through the absorbent filtering body 26, into the chamber 16 and through the orifice 18 in a fine spray to mix with the compressed air.

The continuation of the above mentioned discharge of oil from the reservoir 7 in spray formation will result in a drop in the pressure within the reservoir when the flow through the orifice 18, the chamber 16 and the passage 20 is reversed. When this reverse of flow takes place the pressure in the oil reservoir is again built up to resume the discharge of oil into the air line in the form of a very fine spray or mist.

The purpose of the screw backed spring construction for the filter 26 is as follows: First, it provides an adjustable means for pressing the filter wad 26 against the apertured end of the sleeve 22 to effect a leak-proof seal between the oil chamber 10 and passage 16 when the device is not in use. However, when the lubricator is in use and the pressure in passages 16, 18 and the oil chamber 10 equals the pressure in the air line, the sucking action to which the duct 18 is subjected by the rushing air, the pressure within the oil chamber, or both tends to loosen the pack of the filter wad and draw it down in its tube 22, the spring 30 contracting to permit this action. It is also noted that the end opening of the sleeve 22 is relatively small so that filter 26 will distend or string out when oil is forced through from the reservoir,—rather than to pack up as might be the case if the whole upper end of the filter were exposed. Obviously, the foregoing will result in an acceleration of the flow of oil.

With reference to the foregoing description taken in connection with the accompanying drawing it will be seen that a lubricator constructed in accordance with this invention is automatic in operation and when the flow of air is cut off the supply of lubricant will stop itself, thereby relieving the operator of the necessity of either starting or stopping the flow of lubricant.

Attention is directed to the fact that the flow of oil from the reservoir is not only by the force of compressed air but by the capillary attraction of the absorbent filtering body 26. This capillary attraction is accentuated by reason of the loosening of the filtering body permitted by yielding of spring 30 when the duct 18 is under suction.

Having thus described the invention, what is claimed is:—

1. A lubricator for fluid pressure lines comprising a body portion provided with a pressure fluid passageway, an oil chamber, and an interposed filter chamber having communication with said passageway and oil chamber, an expansive fibrous filter plug in said filter chamber, yielding means normally compressing said plug and forcing it against the oil inlet, and said yielding means permitting said plug to expand and withdraw slightly from said oil inlet when said oil and filter chambers are under suction whereby to permit a free flow of oil through said plug.

2. A lubricator for fluid pressure lines comprising a body portion provided with a pressure fluid passageway, an oil chamber, and an interposed filter chamber having communication with said passageway and oil chamber, an expansive fibrous filter plug in said filter chamber, yielding means normally compressing said plug and forcing it against the oil inlet, said yielding means permitting said plug to expand and withdraw slightly from said oil inlet when said oil and filter chambers are under suction whereby to permit a free flow of oil through said plug, said filter chamber having an opening at one end through which said plug and yielding means may be inserted, and a closure plug threaded in said opening and forming a backing for said yielding means.

3. A lubricator for fluid pressure pipe lines comprising a bulbulos shell-like body portion having an opening at each end, a pipe establishing communication between said openings and defining an annular surrounding oil chamber in said body portion, the latter having an elongated enlargement adjacent one end, said enlargement being cored out to provide a filter chamber having ducts communicating with said oil chamber and said pressure fluid passageway, fibrous filtering material in said chamber, and means for preventing said material from passing into said ducts.

4. A lubricator for fluid pressure pipe lines comprising a bulbulos shell-like body portion having an opening at each end, a pipe establishing communication between said openings and defining an annular surrounding oil chamber in said body portion, the latter having an elongated enlargement adjacent one end, said enlargement being cored out to provide a filter chamber having ducts communicating with said oil chamber and said pressure fluid passageway, a sleeve carried in said filter chamber and having one end fixed in the end wall of said filter chamber and surrounding the mouth of said oil chamber duct, expansive fibrous filtering material in said sleeve, a spring bearing against said filtering material adjacent the outlet end of said sleeve, and a screw plug closure for the open end of said filter chamber, said plug forming an adjustable backing for said spring substantially as and for the purpose set forth.

5. A lubricator for fluid pressure lines comprising a body portion provided with a pressure fluid passageway, an oil chamber, and a filter chamber having ducts leading therefrom for establishing communication between said oil chamber and said pressure fluid passageway, a sleeve fixedly positioned in said filter chamber and having one end directly communicating with said oil chamber duct, expansive filtering material within said sleeve, and yielding means normally bearing against said filtering material within said conduit to compress the same and prevent leakage of the oil when the device is not in use, and said yielding means permitting said filtering material to expand under suction from said pressure fluid passageway to allow free passage of oil therethrough.

6. A lubricator for fluid pressure pipe lines comprising a shell-like body portion having an opening at each end, a tubular conduit within said shell and of smaller cross-sectional dimension than said openings, sealing members located within said shell and adjacent each end thereof, said members engaging said conduit to define an annular oil reservoir around the latter, the opening at one end of said shell being tapped to receive the threaded end of the pressure line pipe, the adjacent end of said conduit terminating short of said tapped opening, said sealing members defining with the adjacent wall of said shell and the end of said conduit a circumferential abutment, said shell having a transverse duct leading from a point just in advance of said abutment, a boss formed at one end of said shell and having a longitudinal bore therein with which said aforementioned duct communicates, and said bore having a second duct communicating with said oil reservoir.

7. A lubricator for fluid pressure pipe lines comprising a shell-like body portion having an opening at each end, a tubular conduit within said shell and of smaller cross-sectional dimension than said openings, sealing members located within said shell and adjacent each end thereof, said members engaging said conduit to define an annular oil reservoir around the latter, the opening at one end of said shell being tapped to receive the threaded end of the pressure line pipe, the adjacent end of said conduit terminating short of said tapped opening, said sealing members defining with the adjacent wall of said shell and the end of said conduit a circumferential abutment, said shell having a transverse duct leading from a point just in advance of said abutment, a boss formed at one end of said shell and having a longitudinal bore therein constituting a filter chamber with which said aforementioned duct communicates, and said bore having a second duct communicating with said oil reservoir, a sleeve member carried in said filter chamber and having communication with said second-mentioned duct leading from said oil reservoir, said sleeve member being of smaller cross-sectional dimension than said filter chamber and spaced from the mouth of said first-mentioned duct, absorbent filtering material within said sleeve, and a spring positioned at the end of said filter chamber and engaging said filtering material for normally compressing the same to prevent leakage of the oil through said sleeve when the lubricator is not in use.

8. In a lubricator for fluid pressure pipe lines comprising a body portion having a fluid pressure conduit, an oil reservoir, and a passage establishing communication between said fluid pressure conduit and said reservoir; the combination of an abutment in said fluid pressure conduit adjacent the passage leading to said reservoir, and the mouth of said passage being between said abutment and the inlet end of said conduit.

In testimony whereof I affix my signature.

EMRA W. BITTICKS.